(12) United States Patent
Wright et al.

(10) Patent No.: US 8,152,996 B2
(45) Date of Patent: *Apr. 10, 2012

(54) FILTER ANTI-DRAINBACK VALVE AND MEDIA PACK SEAL

(75) Inventors: Allen Buhr Wright, Hope Mills, NC (US); L. Steven Cline, Fayetteville, NC (US); Brian Glenn Yates, Holly Springs, NC (US)

(73) Assignee: Purolator Filters NA LLC, Fayetteville, NC (US)

( * ) Notice: Subject to any disclaimer, the term of this patent is extended or adjusted under 35 U.S.C. 154(b) by 1035 days.

This patent is subject to a terminal disclaimer.

(21) Appl. No.: 11/410,122

(22) Filed: Apr. 24, 2006

(65) Prior Publication Data

US 2007/0246409 A1   Oct. 25, 2007

(51) Int. Cl.
*B01D 27/10* (2006.01)
*B01D 35/157* (2006.01)
*B01D 27/00* (2006.01)

(52) U.S. Cl. ......... 210/136; 210/130; 210/429; 210/437
(58) Field of Classification Search .................. None
See application file for complete search history.

(56) References Cited

U.S. PATENT DOCUMENTS

| | | | |
|---|---|---|---|
| 3,305,095 A * | 2/1967 | Hathaway | 210/130 |
| 3,567,023 A * | 3/1971 | Buckman et al. | 210/130 |
| 5,284,579 A * | 2/1994 | Covington | 210/130 |
| 5,405,527 A * | 4/1995 | Covington | 210/130 |
| 6,136,183 A * | 10/2000 | Suzuki et al. | 210/130 |
| 6,375,836 B1 * | 4/2002 | Yano et al. | 210/130 |
| 6,595,372 B1 * | 7/2003 | Minowa et al. | 210/440 |
| 6,793,808 B2 * | 9/2004 | McKenzie | 210/130 |
| 6,966,981 B2 * | 11/2005 | Binder et al. | 210/136 |

OTHER PUBLICATIONS

Most recently filed Reply, dated Jul. 14, 2010, for U.S. Appl. No. 11/409,573.
Most recently filed Reply, dated Jul. 1, 2010, for U.S. Appl. No. 11/612,205.
Most recently filed Reply, dated Jan. 20, 2011, for U.S. Appl. No. 11/612,205.

* cited by examiner

*Primary Examiner* — Nam Nguyen
*Assistant Examiner* — Madeline Gonzalez
(74) *Attorney, Agent, or Firm* — Crowell & Moring LLP

(57) ABSTRACT

A filter is provided having a housing that includes a cavity. A center tube includes first and second ends spaced from one another. A seat extends radially from the center tube and is arranged between the first and second ends. A media pack is arranged within the cavity and supported on the seat such that the center tube extends through a central opening of the media pack. An anti-drainback valve is supported on the seat and is in sealing engagement with the center tube and the media pack. The housing includes a tapping plate that provides an inlet and outlet. An annular lip of the anti-drainback valve is in sealing engagement with the tapping plate when in a closed position in which the engine is shut off.

15 Claims, 3 Drawing Sheets

FILTER ANTI-DRAINBACK VALVE AND MEDIA PACK SEAL

BACKGROUND OF THE INVENTION

This invention relates to an anti-drainback valve for a filter, such as an oil filter.

Anti-drainback valves are used in oil filters to prevent the back flow of oil from the filter once an engine is shut off. The anti-drainback valve retains the oil in the filter where it is ready for the next engine start, and also prevents debris at a dirty side of filter media within the filter from entering the oil system.

A media pack is arranged within a cavity of the filter. The media pack typically includes a pair of end caps having a filter media such as a pleated element secured between the end caps by adhesive. A center tube is typically received within a central opening of the filter media and retained between the end caps as well. The media pack is sealed relative to the filter housing to ensure that oil flows through the filter media. The anti-drainback valve is arranged remotely from the media pack and is typically supported relative thereto by a secondary structure. Typically the media pack and/or the secondary structure uses gaskets to seal the media pack within the filter housing. Sealing the media pack in this manner requires additional parts and assembly operations. What is needed is a simplified assembly and fewer parts.

SUMMARY OF THE INVENTION

A filter is provided having a housing that includes a cavity. A center tube includes first and second ends spaced from one another. A seat extends radially from the center tube and is arranged between the first and second ends. A media pack is arranged within the cavity and supported on the seat such that the center tube extends through a central opening of the media pack. An anti-drainback valve is supported on the seat and is in sealing engagement with the center tube and the media pack. In one example, the anti-drainback valve is in direct sealing engagement with a filter element, which may be a pocket-pleated filter media.

The housing includes a tapping plate that provides an inlet and an outlet. An annular lip of the anti-drainback valve is in sealing engagement with the tapping plate when in a closed position in which the engine is shut off.

The filter is assembled by providing a center tube having a body extending axially between the first and second end. An anti-drainback valve is installed onto the body so that it is in sealing engagement with the seat. A media pack is installed onto the body so that the anti-drainback valve is in sealing engagement with the media pack. The anti-drainback valve is in sealing engagement with the tapping plate once the filter has been fully assembled.

Accordingly, the present invention uses fewer parts by utilizing the anti-drainback valve for a seal for the media pack, thus simplifying assembly.

These and other features of the present invention can be best understood from the following specification and drawings, the following of which is a brief description.

DETAILED DESCRIPTION OF THE PREFERRED EMBODIMENT

Figure 1:
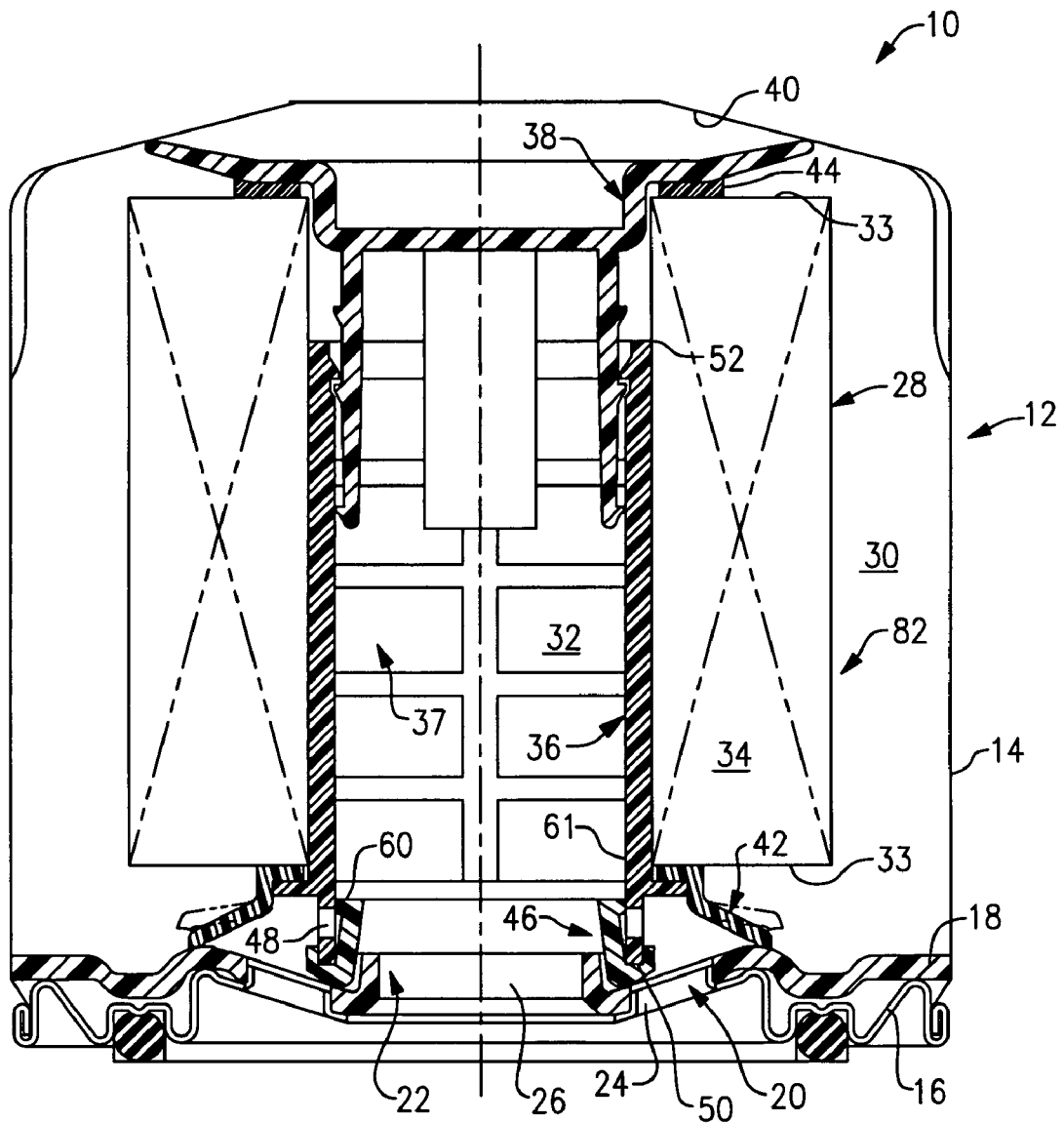
FIG. 1 is a cross-sectional view of a filter using the inventive anti-drainback valve arrangement.

A filter 10 is shown in FIG. 1 and is representative of a typical spin-on oil filter. The filter 10 includes a housing 12 having a can 14 that provides a cavity. A retainer 16 is secured to the can 14 to retain a tapping plate 18. The tapping plate 18 includes an inlet 20 provided by multiple apertures 24 arranged circumferentially about an outlet 22. The outlet 22 is provided by a threaded hole 26 that is used to secure the filter 10 to a mounting block (not shown).

A media pack 28 is arranged within the housing 12 to filter debris from the oil. Oil flows into the housing 12 through the inlet 20 to an inlet side 30 of the media pack 28. Oil passes through the media pack 28 and exits to an outlet side 32 and flows through the outlet 22.

Figure 2:
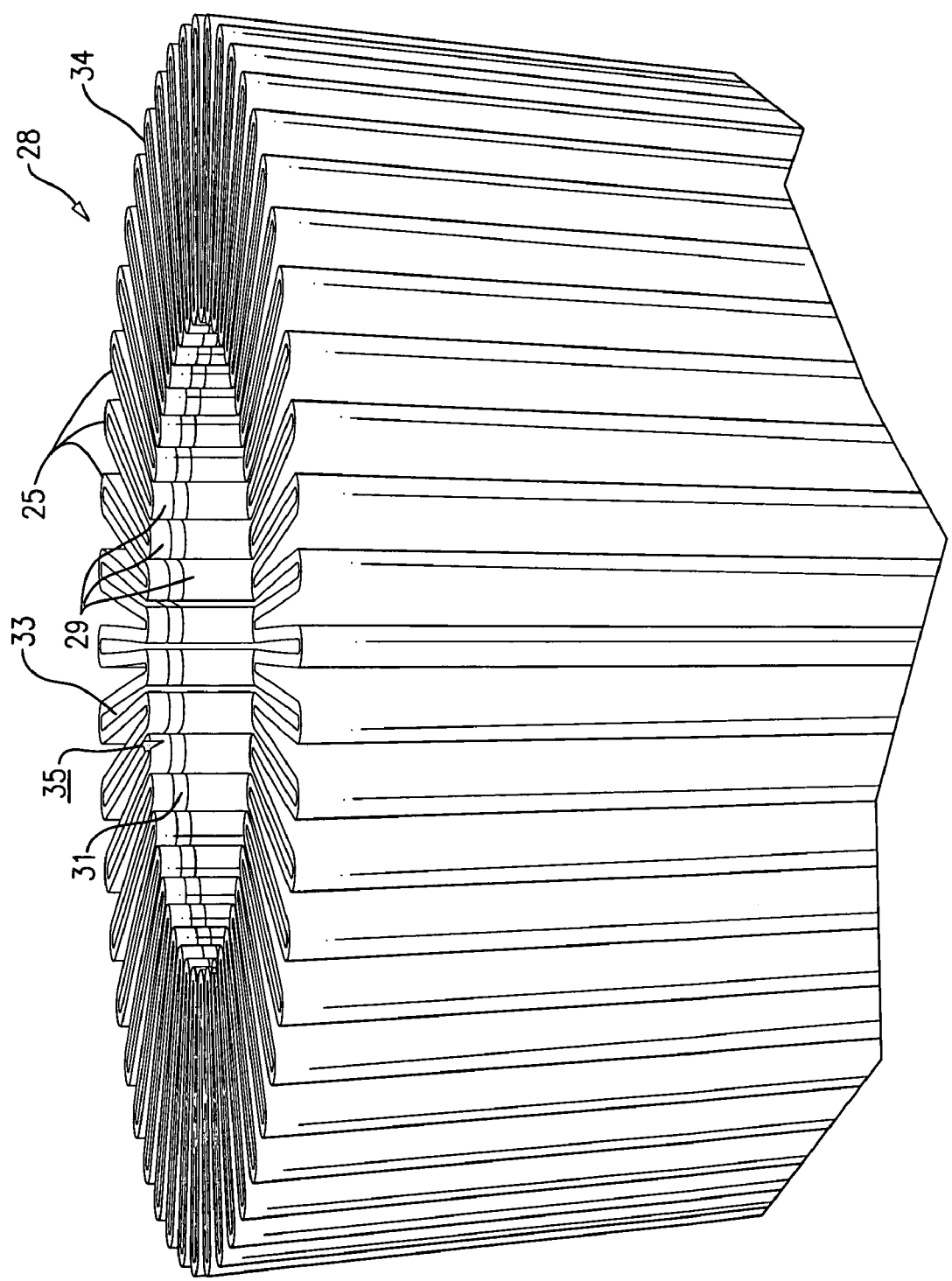
FIG. 2 is a perspective view of media pack used in the filter shown in FIG. 1.

The media pack 28 includes a filter media 34 for debris removal. The filter media 34 can be arranged between two end caps in a known manner (not shown). Alternatively, the media pack 28 may be provided using the filter media 34 arranged in a pocket-pleated arrangement, shown in FIG. 2. The filter media 34 includes pleats 25 arranged in pockets, as is known in the art. The pleats 25 are by secured beads of adhesive 31 near each of opposing ends 33, to form the pockets, so that the inner edges 29 are in close proximity to one another. The inner edges 29 provide a central opening 35 that extends between the ends 33. Using a filter media 34 of the type shown in FIG. 2 permits the elimination of end caps that are typically secured to the ends 33. Instead, flexible seals are arranged at the ends 33 and extend to the inner edges 29 to ensure that oil flows from the inlet side 30 to the outlet side 32 without bypassing the filter media 34.

Returning to FIG. 1, a center tube 36 is arranged within the central opening 35 (FIG. 2) to support the inner edges 29 so that the filter media 34 does not collapse inwardly under oil pressure. The center tube 36 is a unitary structure in the example shown and includes openings 37 that permit oil to flow through the center tube 36. A guide 38 is secured to the center tube 36. The guide 38 engages a wall 40 of the housing 12 to position and load the components within the filter 10 as desired. To seal the filter media 34, a seal 44 is provided between the filter media 34 and the guide 38. An anti-drainback valve 42 is arranged between the other end 33 and the center tube 36 to provide a seal. In this manner, an additional gasket or seal is not needed to seal the end of media pack 28 near the tapping plate 18. A relief valve 46 is supported by a first end 50 of the center tube 36 while an opposing second end 52 of the center tube is used to secure the guide 38 with an interlocking connection, in the example shown. The anti-drainback valve 42, seal 44 and relief valve 46 are constructed from suitable materials, such as elastomers, to provide an adequate seal between the adjacent components.

Figure 3:
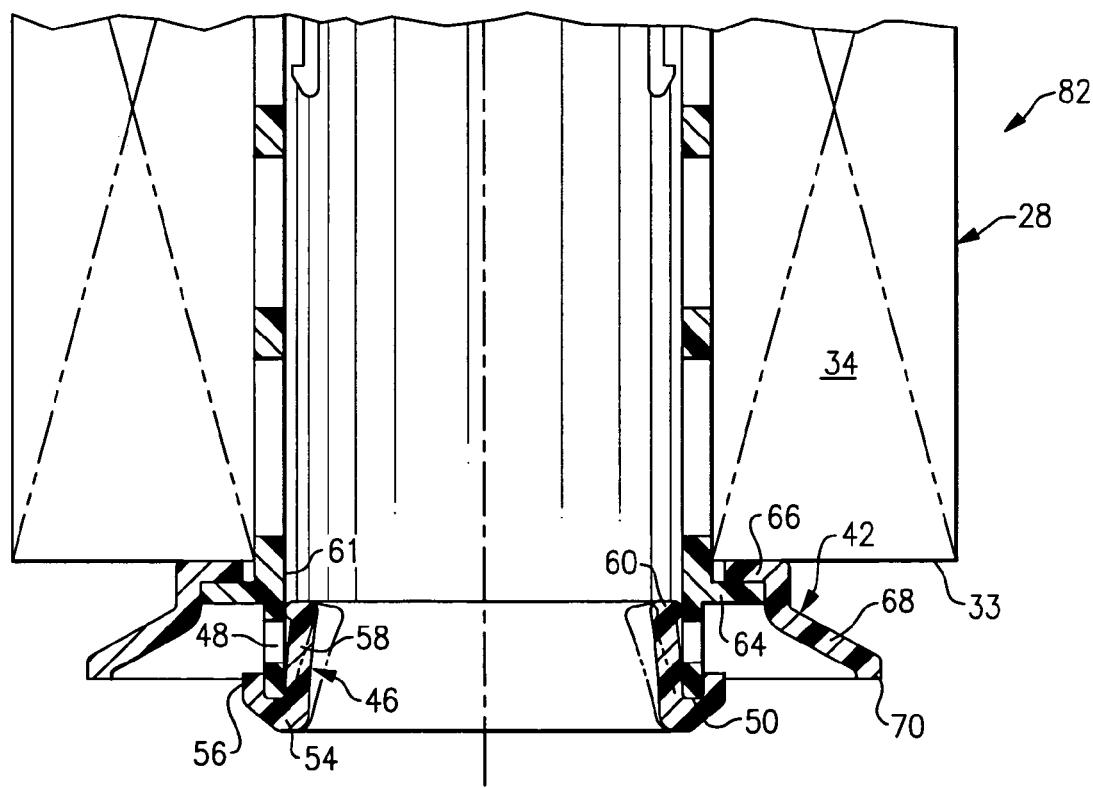
FIG. 3 is an enlarged cross-sectional view of a portion of FIG. 1 illustrating an end of a filter cartridge assembly with the anti-drainback valve in sealing engagement with a center tube and a filter media.

Referring to FIG. 3, the relief valve 46 includes a base 54 from which outer and inner legs 56 and 58 extend. A groove is arranged between the outer and inner legs 56 and 58 to provide a J-shaped cross-section. The inner leg 58 includes a lip 60 that engages an inner surface 61 of the center tube 36. The inner leg 58 blocks openings 48 in the center tube 36 when the relief valve 46 is in the closed position, which is shown. The lip 60 is spaced from the inner surface 61 in the open position, shown in phantom in FIG. 3. The inner leg 58 is arranged at the interior of the center tube 36 so as not to interfere with the operation of the anti-drainback valve 42. The open relief valve 46 permits oil to flow directly from the inlet 20 through the openings 48 and out the outlet 22. The relief valve 46 moves to the open position under high oil pressure conditions, or when the filter media 34 has become clogged, to bypass the filter media 34.

The center tube 36 includes a seat 64 that extends outwardly from the center tube 36. The anti-drainback valve 42 includes an annular flange 66 that is supported on the seat 64 and acts as a seal between the center tube 36 and the end 33. An intermediate portion 68 extends radially outward and toward the tapping plate 18 (FIG. 1) to an annular lip 70 that is in sealing engagement with the tapping plate 18 when the anti-drainback valve 42 is in a closed position. The intermediate portion 68 and annular lip 70 are arranged radially outwardly of the inner leg 58 so as not to interfere with the operation of the relief valve 46. The anti-drainback valve 42 is shown in the open position by the phantom line in FIG. 1 and disengaged from the tapping plate 18. The anti-drainback valve 42 is in the open position (phantom in FIG. 1) during normal operating conditions to permit oil to flow into the filter 10. The anti-drainback valve 42 closes to prevent debris from the dirty side of the filter media 34 from draining back to the engine when it is not running.

Referring to FIG. 1, the media pack 28, center tube 36, guide 38, seal 44 and anti-drainback valve 42 provide a filter cartridge assembly 82. The relief valve 46 acts as a seal between the filter cartridge assembly 82 and the tapping plate 18.

The filter 10 is relatively easy to assemble compared to prior art filter arrangements. First, the anti-drainback valve 42 is installed onto the center tube 36 so that the annular flange 66 is supported on the seat 64. Alternatively, the anti-drainback valve 42 can be over molded onto the center tube 36. The second end 52 of the center tube 36 is inserted into the central opening 35 of the media pack 28. The seal 44 is installed onto the guide 38. The seal 44 may also be glued to the guide 38 or over molded onto it. The guide 38 is secured to the center tube 36 using the interlocking connection. The center tube 36 and guide 38 are loaded so that the anti-drainback valve 42 and seal 44 are in good sealing engagement with the opposing ends 33 of the media pack 28.

The relief valve 46 is installed onto the filter cartridge assembly 82 so that the first end 50 is seated in the groove of the relief valve 46. The filter cartridge assembly 82 is then inserted into the cavity provided by the can 14. The tapping plate 18 is secured to the can 14 using the retainer 16, as is well known in the art. The base 54 of the relief valve 46 seals against the tapping plate 18.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A filter comprising:
   a center tube having first and second ends spaced from one another, a seat extending radially from the center tube and arranged between the first and second ends, and being located closer to the first end; and
   an anti-drainback valve supported on the seat, a first end of the anti-drainback valve being in sealing engagement with a horizontal surface of the seat facing the second end of the center tube,
   wherein the center tube includes an axially extending body, the axially extending body includes a plurality of openings for connecting an inside and an outside of said center tube, and
   the center tube includes an inner surface, and a relief valve is supported on the first end, the relief valve including an inner leg in sealing engagement with the inner surface when in a closed position, the inner leg deflecting radially inwardly away from the inner surface in an open position.

2. The filter according to claim 1, wherein the axially extending body has a cylindrical shape.

3. The filter according to claim 2, wherein the seat forms a unitary structure with the axially extending body and extends radially outward from and about an outer surface of the axially extending body.

4. The filter according to claim 1, wherein the anti-drainback valve is annular in shape.

5. The filter according to claim 4, wherein the anti-drainback valve includes an annular flange supported by the center tube and an intermediate portion extending radially outwardly and downwardly from the annular flange toward the first end to an annular lip, the annular lip adapted for sealing against a housing of the filter.

6. A filter comprising:
   a housing providing a cavity;
   a media pack arranged in the cavity and having a central opening extending between opposing ends of the media pack;
   an anti-drainback valve in sealing engagement with the media pack, the anti-drainback valve movable between open and closed positions, wherein the anti-drainback valve includes a lip that is in sealing engagement with a portion of the housing in the closed position and spaced from the portion in the open position;
   a center tube arranged within the central opening, the anti-drainback valve in sealing engagement with the center tube, and the media pack surrounding said center tube,
   wherein said center tube has a plurality of openings for connecting said media pack and said central opening,
   wherein the center tube includes a seat extending radially outwardly with the anti-drainback valve supported on the seat, and
   wherein the anti-drainback valve includes an annular flange in sealing engagement with a horizontal surface of the seat facing the media pack, the anti-drainback valve including an intermediate portion extending from the annular flange to an annular lip, the annular lip in sealing engagement with the housing when in the closed position.

7. The filter according to claim 6, wherein the media pack includes a filter media, and the anti-drainback valve is in sealing engagement against the filter media.

8. The filter according to claim 7, wherein a filter media is a pocket-pleated media.

9. The filter according to claim 6, wherein the housing includes a tapping plate providing an inlet and outlet, the anti-drainback valve in sealing engagement against the tapping plate when in the closed position, the anti-drainback valve deflecting away from the tapping plate in the open position.

10. The filter according to claim 9, wherein a relief valve is arranged radially inward of the anti-drainback valve.

11. A method of assembling a filter comprising the steps of:
   a) providing a center tube having an axially extending body,
   b) installing an anti-drainback valve onto the axially extending body; and c) installing a media pack onto the axially extending body so that the anti-drainback valve is in sealing engagement with the media pack and the center tube, wherein the axially extending body includes a plurality of openings for connecting an inside and an outside of said center tube, and wherein the center tube includes opposing ends with a seat arranged between the opposing ends and extending radially outward to support a horizontal portion of the anti-drainback valve, the horizontal portion being in sealing engagement with a horizontal surface of the seat facing the media pack.

12. The method of according to claim 11, wherein the center tube has a unitary structure.

13. The method according to claim 11, wherein the media pack is a filter media, the anti-drainback valve in sealing engagement with the filler media.

14. The method according to claim 11, comprising a step d) that includes inserting the anti-drainback valve into, a cavity of a filter housing and into sealing engagement with the filter housing.

15. The method according to claim 1, wherein the first end of the anti-drainback valve being in sealing engagement with a vertical surface of the center tube adjacent to the horizontal surface of the seat.

\* \* \* \* \*